(12) United States Patent
Kitagawa et al.

(10) Patent No.: US 11,383,459 B2
(45) Date of Patent: Jul. 12, 2022

(54) FIBER-REINFORCED RESIN HOLLOW BODY AND MANUFACTURING METHOD FOR SAME

(71) Applicants: KURIMOTO, LTD., Osaka (JP); MAZDA MOTOR CORPORATION, Hiroshima (JP)

(72) Inventors: Takeshi Kitagawa, Osaka (JP); Masaya Hazama, Osaka (JP); Toshiki Okauji, Osaka (JP); Makoto Takeda, Osaka (JP); Jun Watanabe, Osaka (JP); Takashi Tabakoya, Osaka (JP); Shin Matsumura, Osaka (JP); Yoshiyasu Kajimoto, Hiroshima (JP); Kazuhisa To, Hiroshima (JP)

(73) Assignees: KURIMOTO, LTD., Osaka (JP); MAZDA MOTOR CORPORATION, Hiroshima (JP)

( * ) Notice: Subject to any disclaimer, the term of this patent is extended or adjusted under 35 U.S.C. 154(b) by 764 days.

(21) Appl. No.: 16/089,237

(22) PCT Filed: Mar. 29, 2017

(86) PCT No.: PCT/JP2017/013123
§ 371 (c)(1),
(2) Date: Sep. 27, 2018

(87) PCT Pub. No.: WO2017/170802
PCT Pub. Date: Oct. 5, 2017

(65) Prior Publication Data
US 2019/0143612 A1    May 16, 2019

(30) Foreign Application Priority Data
Mar. 30, 2016    (JP) .............................. JP2016-069358

(51) Int. Cl.
  *B32B 5/12*    (2006.01)
  *B29C 70/12*   (2006.01)
  (Continued)

(52) U.S. Cl.
  CPC .............. *B29C 70/12* (2013.01); *B29C 70/22* (2013.01); *B29C 70/52* (2013.01); *B32B 1/08* (2013.01);
  (Continued)

(58) Field of Classification Search
  CPC ......... B29C 70/12; B29C 70/52; B29C 70/22; B29K 2307/04; B32B 5/12
  (Continued)

(56) References Cited

U.S. PATENT DOCUMENTS

| | | | | |
|---|---|---|---|---|
| 4,657,795 A | * | 4/1987 | Foret | B29C 53/56 138/153 |
| 5,191,486 A | * | 3/1993 | Sato | B29C 70/207 138/125 |

(Continued)

FOREIGN PATENT DOCUMENTS

| DE | 10309806 A1 | 10/2003 |
|---|---|---|
| DE | 102014214405 A1 | 1/2015 |

(Continued)

OTHER PUBLICATIONS

International Search Report issued in PCT/JP2017/013123; dated Jun. 20, 2017.

*Primary Examiner* — Patrick F Brinson
(74) *Attorney, Agent, or Firm* — Studebaker & Brackett PC

(57) ABSTRACT

A fiber-reinforced resin hollow body includes an axial-direction fiber layer containing reinforcing fibers aligned parallel to an axial direction of the hollow body, and a non-axial-direction fiber layer provided on top of at least one (Continued)

of an internal and an external side of the axial-direction fiber layer, and containing reinforcing fibers oriented in a direction different from the alignment direction of the axial-direction fiber layer. The non-axial-direction fiber layer includes one or more peripheral-direction fiber layers containing reinforcing fibers aligned parallel to a peripheral direction of the hollow body, and one or more non-aligned fiber layers containing reinforcing fibers not aligned in a specific direction.

12 Claims, 12 Drawing Sheets

(51) Int. Cl.
*B29C 70/52* (2006.01)
*B29C 70/22* (2006.01)
*C08J 5/04* (2006.01)
*B60K 37/00* (2006.01)
*B32B 1/08* (2006.01)
 B32B 5/28 (2006.01)
 B29C 70/08 (2006.01)
 B29K 101/10 (2006.01)
 B29K 307/04 (2006.01)
 B29K 309/08 (2006.01)

(52) U.S. Cl.
CPC ............... *B32B 5/12* (2013.01); *B60K 37/00* (2013.01); *C08J 5/04* (2013.01); *B29C 70/08* (2013.01); *B29K 2101/10* (2013.01); *B29K 2307/04* (2013.01); *B29K 2309/08* (2013.01); *B32B 5/28* (2013.01); *B32B 2250/20* (2013.01); *B32B 2260/023* (2013.01); *B32B 2260/046* (2013.01); *B32B 2597/00* (2013.01); *Y10T 428/1362* (2015.01); *Y10T 428/31504* (2015.04); *Y10T 442/20* (2015.04)

(58) Field of Classification Search
USPC ............... 138/123, 124, 129, 130, 137, 140; 428/36.1, 36.3, 36.4, 36.9, 36.91
See application file for complete search history.

(56) References Cited

U.S. PATENT DOCUMENTS

| | | | | |
|---|---|---|---|---|
| 5,383,062 A * | 1/1995 | Sato | ...................... | G02B 23/16 138/125 |
| 5,549,947 A * | 8/1996 | Quigley | ................ | B29C 70/222 428/36.2 |
| 5,888,601 A * | 3/1999 | Quigley | .................. | B29C 48/12 428/36.1 |
| 6,106,413 A * | 8/2000 | Kusumoto | ............. | A63B 60/54 473/319 |
| 6,148,865 A * | 11/2000 | Head | ..................... | B29C 70/222 138/123 |
| 6,475,580 B1 * | 11/2002 | Wright | ..................... | B29C 70/86 428/36.3 |
| 2005/0186868 A1 | 8/2005 | Horsting et al. | | |
| 2010/0112249 A1 * | 5/2010 | Boyce | ..................... | B29C 70/12 428/34.5 |

FOREIGN PATENT DOCUMENTS

| | | |
|---|---|---|
| JP | S54-143390 U1 | 10/1979 |
| JP | H04-049028 A | 2/1992 |
| JP | H04-052045 U | 5/1992 |
| JP | H08-282333 A | 10/1996 |
| JP | 2001-171011 A | 6/2001 |
| WO | 2006/044315 A2 | 4/2006 |
| WO | 2008/127800 A1 | 10/2008 |

* cited by examiner

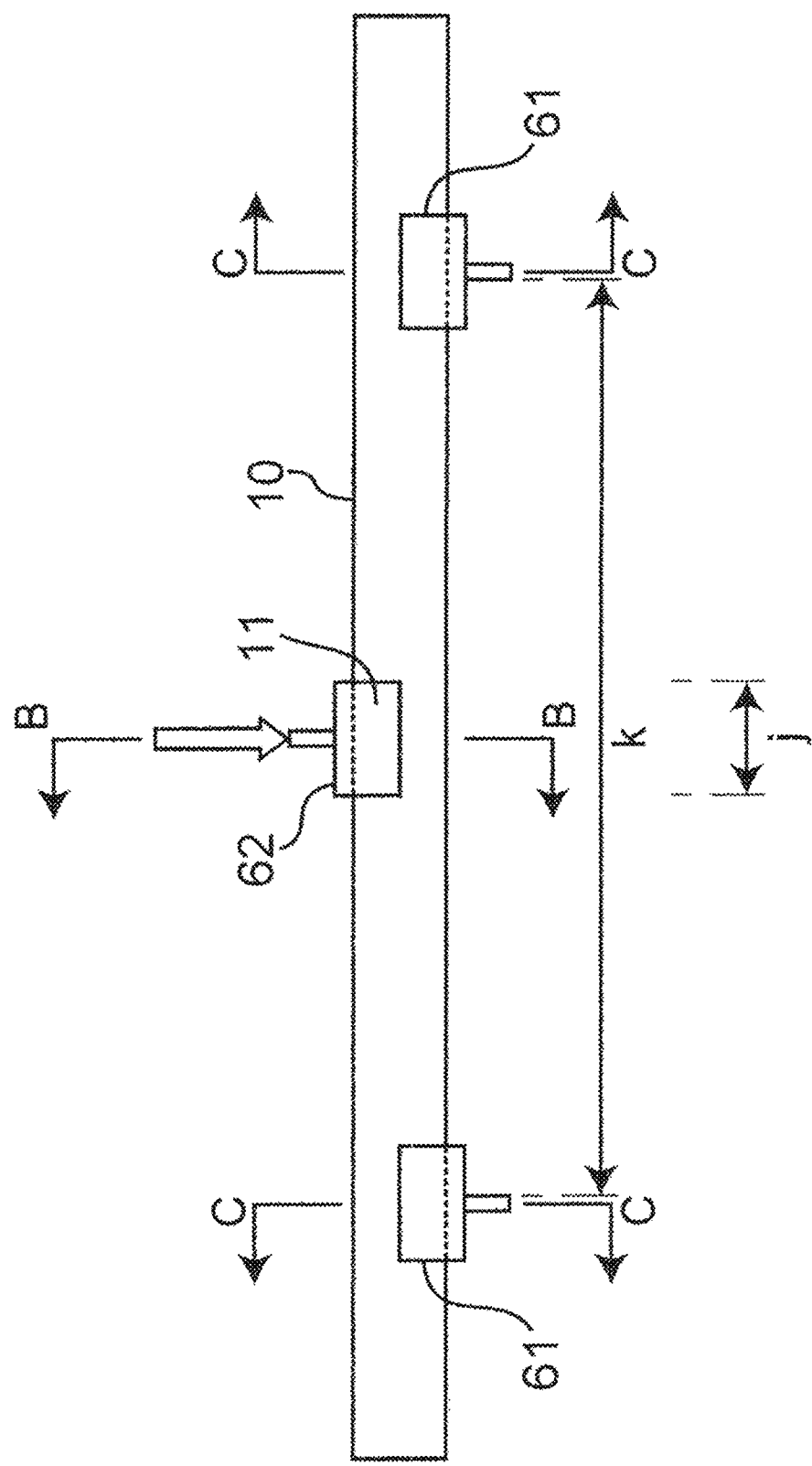

FIG.8
| NAME OF MATERIAL | PHOTOGRAPH |
|---|---|
| ROVING | 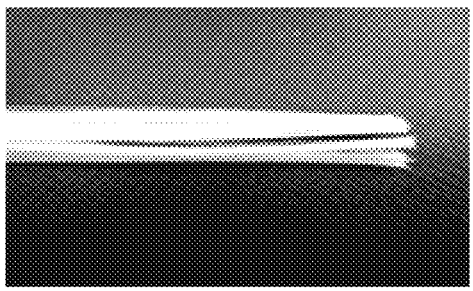 |
| S1 CORD FABRIC | 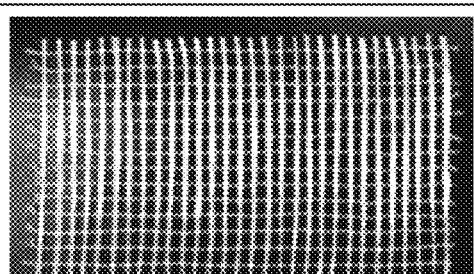 |
| S2 CORD FABRIC | 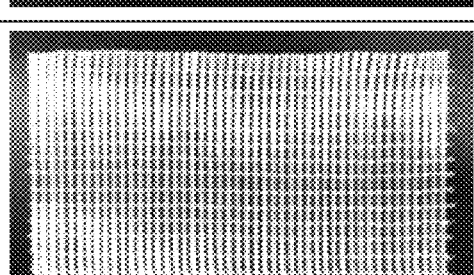 |
| STITCHED CORD-FABRIC MAT |  |
| CHOPPED STRAND MAT | 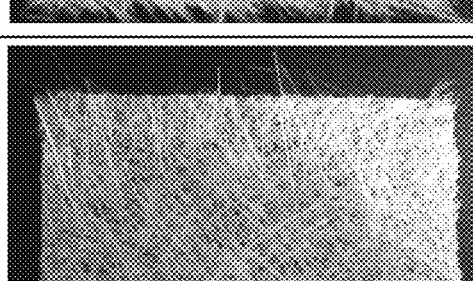 |

FIBER-REINFORCED RESIN HOLLOW BODY AND MANUFACTURING METHOD FOR SAME

TECHNICAL FIELD

The present invention relates to fiber-reinforced resin hollow bodies and methods for manufacturing fiber-reinforced resin hollow bodies.

BACKGROUND ART

Fiber-reinforced resin hollow bodies containing thermosetting resin are used in various fields, such as the fluid transport field, architecture field, and automotive field. Such fiber-reinforced resin hollow bodies are a promising material to replace metal materials, particularly in the automotive field.

Among such fiber-reinforced resin hollow bodies is a reinforcement (rectangular pipe) for attachment of automotive equipment that is described in PATENT DOCUMENT 1. Such a technology may employ an axial-direction fiber layer that contains reinforcing fibers aligned or oriented parallel to the axial direction (longitudinal direction). In this case, the axial-direction fiber layer tends to break like a bamboo splits along the direction in which fibers run. Therefore, it has been necessary to increase the strength not only in the axial direction but also in the peripheral or circumferential direction.

CITATION LIST

Patent Document

PATENT DOCUMENT 1: Japanese Unexamined Patent Publication No. H08-282333

SUMMARY OF THE INVENTION

Technical Problem

The present inventors have found that, in a fiber-reinforced resin hollow body, when a peripheral-direction fiber layer that contains reinforcing fibers aligned parallel to the peripheral direction of the hollow body is used in combination with the axial-direction fiber layer, the effect of improving the strength of the fiber-reinforced resin hollow body may not be sufficient. Specifically, for example, as indicated by a schematic diagram of FIG. 5 that shows a cross-section taken in a direction perpendicular to the axial direction of a hollow body, peripheral-direction fiber layers 121*a*, 122*a*, 131*a*, and 132*a* were simply formed on both the internal side and external side of an axial-direction fiber layer 101, but the strength improving effect of the peripheral direction fabric layers was not sufficient. In such a technology, it is considered that the peripheral-direction fiber layers are locally pulled in a die, so that the alignment of the peripheral direction fibers is disturbed, and therefore, the strength improving effect of the peripheral-direction fiber layers is not sufficiently obtained. It is an object of the present invention to provide a fiber-reinforced resin hollow body having a sufficiently high strength and a method for manufacturing the fiber-reinforced resin hollow body.

Solution to the Problem

The technology disclosed herein relates to a fiber-reinforced resin hollow body that includes an axial-direction fiber layer containing reinforcing fibers aligned parallel to an axial direction of the hollow body, and a non-axial-direction fiber layer provided on top of at least one of an internal and an external side of the axial-direction fiber layer, and containing reinforcing fibers oriented in a direction different from the alignment direction of the axial-direction fiber layer. The non-axial-direction fiber layer includes one or more peripheral-direction fiber layers containing reinforcing fibers aligned parallel to a peripheral direction of the hollow body, and one or more non-aligned fiber layers containing reinforcing fibers not aligned in a specific direction.

Advantages of the Invention

The fiber-reinforced resin hollow body of the present technology disclosed herein has a sufficiently high strength.

BRIEF DESCRIPTION OF THE DRAWINGS

FIG. 6A is a diagram for describing a procedure for a bending test that was carried out using specimens of examples.

FIG. 8 is a table showing materials used in specimens of examples.

DESCRIPTION OF EMBODIMENTS

Figure 1:
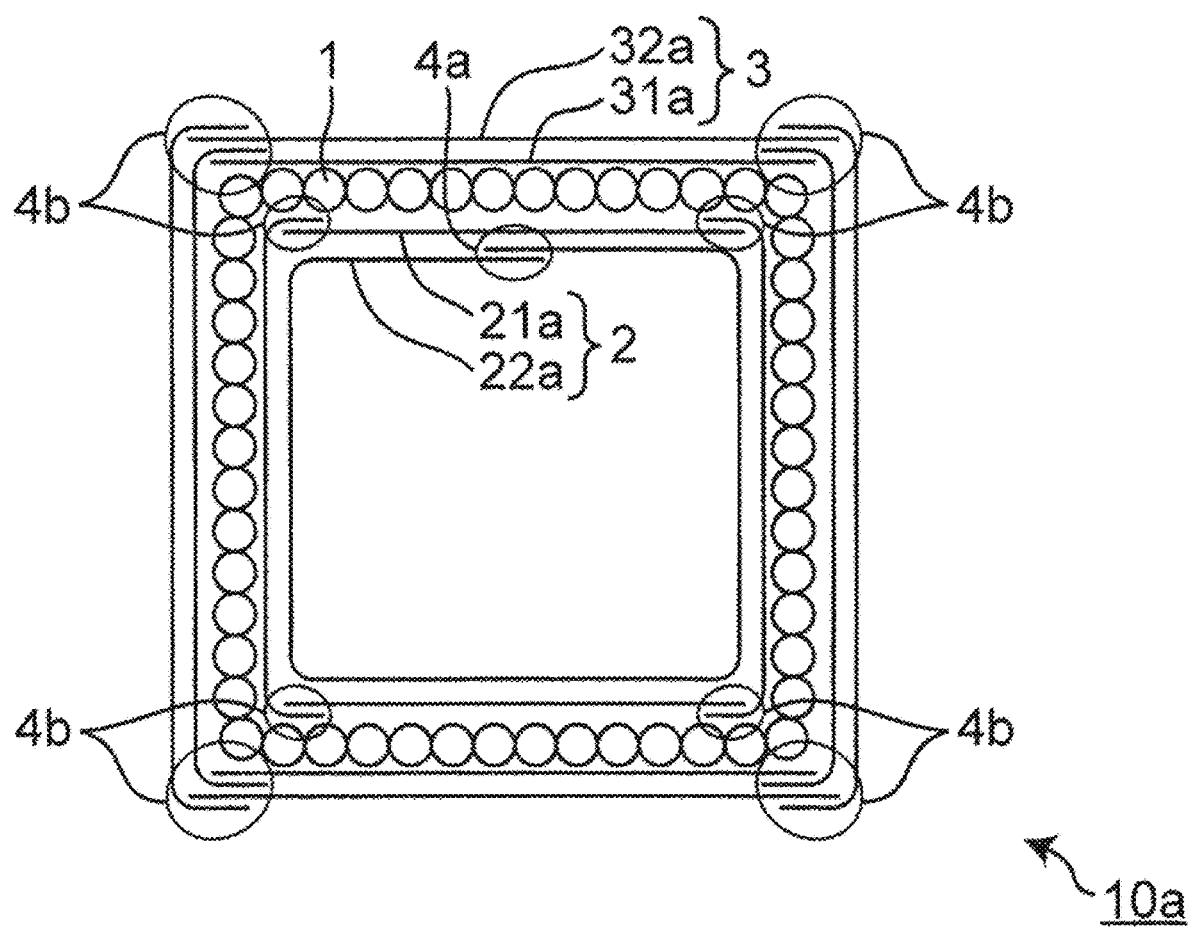
FIG. 1 is a schematic diagram showing a rough cross-section perpendicular to an axial direction in an example fiber-reinforced resin hollow body of the present technology disclosed herein.

Embodiments of the present technology disclosed herein will now be described in detail with reference to the accompanying drawings. The embodiments described below are merely preferred examples in nature and are not intended to limit the present technology disclosed herein, application, or uses.

[Fiber-Reinforced Resin Hollow Body]

A fiber-reinforced resin hollow body according to the present technology disclosed herein will be described in detail with reference to the drawings. Parts shown in the drawings are merely schematically shown for ease of understanding the present technology disclosed herein, and may not be to scale and have external appearances different from actual ones. Note that the term "vertical direction" directly or indirectly used herein refers to the vertical direction in the drawings. Unless otherwise specified, like members, portions, dimensions, or regions are indicated by like reference characters throughout the drawings.

A fiber-reinforced resin hollow body (may also be hereinafter simply referred to as a "hollow body") according to the present technology disclosed herein is a body having an elongated shape and impregnated with a curable resin, more specifically an elongated molded body having a hollow shape and including fiber layers containing reinforcing fibers and a curable resin permeating the fiber layers and cured. The longitudinal direction of the hollow body is referred to as an "axial direction."

(Fiber Layers)

The fiber layers containing reinforcing fibers in the hollow body of the present technology disclosed herein include at least an axial-direction fiber layer and a non-axial-direction fiber layer provided on top of at least one of the internal side and external side of the axial-direction fiber layer. Although, for example, a hollow body 10a of the present technology disclosed herein shown in FIG. 1 has an axial-direction fiber layer 1, and non-axial-direction fiber layers 2 and 3 on the internal and external sides, respectively, of the axial-direction fiber layer 1, a non-axial-direction fiber layer is provided on at least one of the internal and external sides of the axial-direction fiber layer 1. The hollow body 10a preferably has a non-axial-direction fiber layer on at least the internal side of the axial-direction fiber layer 1, more preferably on both the internal and external sides, in terms of the strength of the hollow body. A non-axial-direction fiber layer provided on top of the internal side of the axial-direction fiber layer 1 may also be herein referred to as an "internal non-axial-direction fiber layer," and is indicated by a reference character "2" in FIG. 1. A non-axial-direction fiber layer provided on top of the external side of the axial-direction fiber layer 1 may also be herein referred to as an "external non-axial-direction fiber layer," and is indicated by a reference character "3" in FIG. 1.

The axial-direction fiber layer 1 refers to a fiber layer that mainly contains reinforcing fibers aligned parallel to the axial direction (longitudinal direction) of the hollow body. In the present technology disclosed herein, the axial-direction fiber layer 1 preferably contains only reinforcing fibers aligned parallel to the axial direction of the hollow body. Such a preferable axial-direction fiber layer does not necessarily contain exactly only reinforcing fibers aligned parallel to the axial direction of the hollow body. In such a preferable axial-direction fiber layer, 95 mass % or more, preferably 98 mass % or more, of the reinforcing fibers contained therein are aligned substantially parallel to the axial direction of the hollow body. As used herein, the term "substantially parallel" with respect to reinforcing fibers and the axial direction of the hollow body means that the angle between the reinforcing fibers and the axial direction of the hollow body falls within the range of ±10°.

The reinforcing fibers constituting the axial-direction fiber layer 1 may be any fibers that have been conventionally used in the fiber-reinforced plastic field. Examples of the reinforcing fibers constituting the axial-direction fiber layer 1 include glass fibers and carbon fibers. The reinforcing fibers constituting the axial-direction fiber layer 1 are preferably glass fibers. Rovings (bundles of glass fibers) of the reinforcing fibers constituting the axial-direction fiber layer 1 typically fall within the range of 500-5000 tex (g/km). Although the axial-direction fiber layer 1 may contain other fibers in addition to the reinforcing fibers, the reinforcing fibers preferably accounts for 95 mass % or more, more preferably 98 mass % or more, of all the fibers contained in the axial-direction fiber layer 1.

Specifically, for example, the axial-direction fiber layer 1 may contain rovings (bundles of glass fibers), and the number of glass fibers constituting the axial-direction fiber layer 1 is preferably uniform in a peripheral direction of the hollow body. The term "peripheral direction" with respect to the hollow body means a peripheral direction of a cross-section of the hollow body perpendicular to the axial direction of the hollow body.

The amount of the fibers in the axial-direction fiber layer 1 is determined according to the desired strength and dimensions of the hollow body. For example, when the hollow body is used as a member for supporting and fixing an automotive instrument panel (a square-tube member having a size of 3-10 cm×3-10 cm), the amount of the fibers in the axial-direction fiber layer 1 per meter of the length of the hollow body is typically 50-1000 g/m.

The non-axial-direction fiber layers 2 and 3 is a fiber layer that contains reinforcing fibers aligned or oriented in a direction different from that in the axial-direction fiber layer 1. The term "aligned or oriented in a direction different from that in the axial-direction fiber layer 1" with respect to reinforcing fibers contained in a non-axial-direction fiber layer means that the reinforcing fibers contained in the non-axial-direction fiber layer are aligned in a specific direction (e.g., the peripheral direction of the hollow body) that is not parallel to the direction in which the reinforcing fibers of the axial-direction fiber layer 1 are aligned, or are oriented in directions that are not limited to any specific direction (e.g., are randomly oriented). Note that the random orientation encompasses irregularly random orientation and regularly random orientation.

The reinforcing fibers constituting the non-axial-direction fiber layers 2 and 3 may each independently be any fibers that have been conventionally used in the fiber-reinforced plastic field, as with the reinforcing fibers constituting the axial-direction fiber layer 1. Examples of the reinforcing fibers constituting the non-axial-direction fiber layers 2 and 3 include glass fibers and carbon fibers. The reinforcing fibers constituting the non-axial-direction fiber layers 2 and 3 are preferably glass fibers. The reinforcing fibers constituting the non-axial-direction fiber layers 2 and 3 have a diameter falling within a range similar to that of the reinforcing fibers of the axial-direction fiber layer. Although the non-axial-direction fiber layers 2 and 3 may contain other fibers in addition to the reinforcing fibers, the reinforcing fibers preferably accounts for 95 mass % or more, more preferably 98 mass % or more, of all the fibers contained in the non-axial-direction fiber layers 2 and 3.

The weights (per unit area) of the non-axial-direction fiber layers 2 and 3 are each independently determined according to the desired strength and dimensions of the hollow body. For example, when the hollow body is used as a member for supporting and fixing an automotive instrument panel (a square-tube member having a size of 3-10 cm×3-10 cm), the weights (per unit area) of the non-axial-direction fiber layers 2 and 3 of the hollow body are each independently typically 10-1000 g/m², preferably 100-500 g/m².

The mass ratio of all the reinforcing fibers of the axial-direction fiber layer to all the reinforcing fibers of the non-axial-direction fiber layers is typically 100:20-100:200, and in terms of the strength of the hollow body, preferably 100:30-100:150, more preferably 100:50-100:120. All the reinforcing fibers of the non-axial-direction fiber layers refers to all the reinforcing fibers of the internal non-axial-direction fiber layer 2 and the external non-axial-direction fiber layer 3.

In the present technology disclosed herein, a non-axial-direction fiber layer includes one or more peripheral-direction fiber layers and one or more non-aligned fiber layers. Although, in FIG. 1, the internal non-axial-direction fiber layer 2 and the external non-axial-direction fiber layer 3 both include one or more peripheral-direction fiber layers and one or more non-aligned fiber layers, at least one of the fiber layers 2 and 3 includes one or more peripheral-direction fiber layers and one or more non-aligned fiber layers. For example, in the case where the hollow body has the internal non-axial-direction fiber layer 2 and does not have the external non-axial-direction fiber layer 3, the internal non-axial-direction fiber layer 2 includes one or more peripheral-direction fiber layers and one or more non-aligned fiber layers. Alternatively, for example, in the case where the hollow body does not have the internal non-axial-direction fiber layer 2 and has the external non-axial-direction fiber layer 3, the external non-axial-direction fiber layer 3 includes one or more peripheral-direction fiber layers and one or more non-aligned fiber layers. Alternatively, for example, in the case where the hollow body has the internal non-axial-direction fiber layer 2 and the external non-axial-direction fiber layer 3, at least one, preferably both, of the internal non-axial-direction fiber layer 2 and the external non-axial-direction fiber layer 3 includes one or more peripheral-direction fiber layers and one or more non-aligned fiber layers. In this case, specifically, if one of the internal non-axial-direction fiber layer 2 and the external non-axial-direction fiber layer 3 includes one or more peripheral-direction fiber layers and one or more non-aligned fiber layers, the other may not include both one or more peripheral-direction fiber layers and one or more non-aligned fiber layers. Specifically, the other satisfies any one of the following conditions: (A) the other includes one or more peripheral-direction fiber layers, and does not include a non-aligned fiber layer; (B) the other does not includes a peripheral-direction fiber layer, and includes one or more non-aligned fiber layers; and (C) the other does not contain a peripheral-direction fiber layer or a non-aligned fiber layer. An internal non-axial-direction fiber layer and an external non-axial-direction fiber layer that satisfy the conditions A-C are similar to an internal non-axial-direction fiber layer 2 and an external non-axial-direction fiber layer 3 described below (an internal non-axial-direction fiber layer 2 and an external non-axial-direction fiber layer 3 each of which includes one or more peripheral-direction fiber layers and one or more non-aligned fiber layers). The internal non-axial-direction fiber layer 2 and the external non-axial-direction fiber layer 3 are hereinafter referred to as the "the non-axial-direction fiber layer 2 (3)" when the same description can apply to both of these layers.

The non-axial-direction fiber layer 2 (3) includes one or more peripheral-direction fiber layers and one or more non-aligned fiber layers, and may each independently, for example, further include one or more fiber layers selected from the group consisting of woven fiber layers, braided fiber layers, and knitted fiber layers. In the case where a non-axial-direction fiber layer includes one or more peripheral-direction fiber layers, then if the non-axial-direction fiber layer further includes one or more non-aligned fiber layers, the disturbance of the alignment of the peripheral-direction fiber layer during manufacture is prevented or reduced, and therefore, reinforcing fibers are sufficiently aligned parallel to the peripheral direction in the peripheral-direction fiber layer. Therefore, the hollow body can acquire a sufficiently high strength. If the non-axial-direction fiber layer does not include a non-aligned fiber layer, the alignment of the peripheral-direction fiber layer is disturbed, and, for example, reinforcing fibers are aligned in an oblique direction with respect to the peripheral direction or are curved.

The peripheral-direction fiber layer refers to a fiber layer containing reinforcing fibers aligned parallel to the peripheral direction of the hollow body. In the present technology disclosed herein, the peripheral-direction fiber layer preferably contains only reinforcing fibers aligned parallel to the peripheral direction of the hollow body. Such a preferable peripheral-direction fiber layer does not necessarily contain exactly only reinforcing fibers aligned parallel to the peripheral direction of the hollow body. In such a preferable peripheral-direction fiber layer, 95 mass % or more, preferably 98 mass % or more, of the reinforcing fibers contained therein are aligned substantially parallel to the peripheral direction of the hollow body. As used herein, the term "substantially parallel" with respect to reinforcing fibers and the peripheral direction of the hollow body means that the angle between the reinforcing fibers and the peripheral direction of the hollow body falls within the range of ±8°.

As a specific example of the peripheral-direction fiber layer, for example, a so-called cord-fabric reinforcing fiber sheet is preferably used. The cord-fabric reinforcing fiber sheet refers to a fiber sheet containing a plurality of reinforcing fiber bundles (e.g., each bundle contains 8-120 reinforcing fibers) that are arranged side by side and substantially equally spaced with each bundle running parallel to a first direction (e.g., the peripheral direction of the hollow body), and are tied together using linking threads in a second direction perpendicular to the first direction. The linking thread may be formed of either a thermoplastic polymer or reinforcing fibers. A roving of reinforcing fibers (a bundle of glass fibers) contained in the peripheral-direction fiber layer is typically within the range of 100-1000 tex (g/km).

The non-aligned fiber layer refers to a fiber layer containing reinforcing fibers that are not aligned in any specific direction (e.g., reinforcing fibers are irregularly randomly oriented). Examples of the non-aligned fiber layer include nonwoven fabric layers of reinforcing fibers, and peripheral direction fiber-containing nonwoven fabric layers of reinforcing fibers.

As the nonwoven fabric layer, for example, a so-called chopped strand mat of reinforcing fibers is preferably used. The chopped strand mat of reinforcing fibers refers to a nonwoven fabric layer containing chopped reinforcing fibers having a fiber length of 6-66 mm that are bonded together using a binder resin. A chopped strand mat used as the nonwoven fabric layer of the peripheral direction fiber-containing nonwoven fabric layer of reinforcing fibers may be formed by randomly sewing chopped reinforcing fibers on the cord-fabric reinforcing fiber sheet. The binder typically includes a thermoplastic polymer.

The peripheral direction fiber-containing nonwoven fabric layer may be a composite fiber layer obtained by bonding a plurality of reinforcing fiber bundles (peripheral direction fiber bundles) (e.g., each bundle contains 8-120 reinforcing fibers) to the nonwoven fabric layer of reinforcing fibers such that the bundles are aligned parallel to the peripheral direction of the hollow body and equally spaced. Alternatively, the peripheral direction fiber-containing nonwoven fabric layer may be a composite fiber layer obtained by randomly sewing and fixing chopped reinforcing fibers having a fiber length of 6-66 mm on the cord-fabric reinforcing fiber sheet. As the peripheral direction fiber-containing nonwoven fabric layer, for example, a chopped strand mat cord fabric is preferably used. The chopped strand mat cord fabric refers to a composite mat obtained by randomly sewing chopped reinforcing fibers having a fiber length of 6-66 mm on the cord-fabric reinforcing fiber sheet. The sewing thread may be either a thread of a thermoplastic polymer or a thread of reinforcing fibers. The mass ratio of all the reinforcing fibers of the nonwoven fabric layer to all the reinforcing fibers as the peripheral direction fibers is typically 100:20-100:200, and in terms of the strength of the hollow body, preferably 100:30-100:150, more preferably 100:50-100:120.

The woven fiber layer may be any fiber layer containing reinforcing fibers that form a weave structure. Examples of the weave structure include plain weave, twill weave, satin weave, and double weave. The reinforcing fibers of the woven fiber layer are regularly randomly oriented.

The braided fiber layer may be any fiber layer containing reinforcing fibers that form a braid structure. The reinforcing fibers of the braided fiber layer are regularly randomly oriented.

The knitted fiber layer may be any fiber layer containing reinforcing fibers that form a knit structure. Examples of the knit structure include weft knit and warp knit. The reinforcing fibers of the knitted fiber layer are regularly randomly oriented.

In FIG. 1, the internal non-axial-direction fiber layer 2 includes a first internal non-axial-direction fiber layer 21a and a second internal non-axial-direction fiber layer 22a, and the external non-axial-direction fiber layer 3 includes a first external non-axial-direction fiber layer 31a and a second external non-axial-direction fiber layer 32a. However, the number, types, and arrangement of fiber layers constituting each of the internal non-axial-direction fiber layer 2 and the external non-axial-direction fiber layer 3 are not particularly limited as long as the internal non-axial-direction fiber layer 2 and the external non-axial-direction fiber layer 3 include one or more peripheral-direction fiber layers and one or more non-aligned fiber layers.

The number of non-aligned fiber layers in the non-axial-direction fiber layer 2 (3) is not particularly limited as long as the alignment disturbance can be prevented or reduced in the peripheral-direction fiber layer.

For example, in the case where the non-axial-direction fiber layer 2 (3) includes a single peripheral-direction fiber layer, the number of non-aligned fiber layers is typically one or more, particularly 1 or 2.

For example, in the case where the non-axial-direction fiber layer 2 (3) includes two peripheral-direction fiber layers, the number of non-aligned fiber layers is typically one or more, particularly 1-3.

In the non-axial-direction fiber layer 2 (3), either a non-aligned fiber layer or a peripheral-direction fiber layer may be disposed at a most peripheral surface of the hollow body 10, i.e., an outermost surface or an innermost surface. Note that, as described below, in terms of improvement in the design of the external appearance, a non-aligned fiber layer is preferably disposed at a most peripheral surface of the hollow body. In this case, the non-aligned fiber layer is more preferably adjacent to a peripheral-direction fiber layer. If a non-aligned fiber layer is disposed at a most peripheral surface, a direct influence of a die on a peripheral-direction fiber layer is reduced, and therefore, in the peripheral-direction fiber layer adjacent to the non-aligned fiber layer, reinforcing fibers are more easily aligned parallel to the peripheral direction, resulting in improvement in the design of the external appearance of the hollow body. Here, the term "non-aligned fiber layer is disposed at a most peripheral surface of the hollow body" means that the non-aligned fiber layer is disposed at the innermost surface of the hollow body in the internal non-axial-direction fiber layer 2, or as the outermost surface of the hollow body in the external non-axial-direction fiber layer 3. For example, as shown in FIG. 1, the first internal non-axial-direction fiber layer 21a and the first external non-axial-direction fiber layer 31a are preferably a peripheral-direction fiber layer, and the second internal non-axial-direction fiber layer 22a and the second external non-axial-direction fiber layer 32a are preferably a non-aligned fiber layer, particularly a peripheral direction fiber-containing nonwoven fabric layer. Also, for example, in a preferred embodiment shown in FIG. 2 described below, a fourth internal non-axial-direction fiber layer 24b is preferably a non-aligned fiber layer, particularly a peripheral direction fiber-containing nonwoven fabric layer. Also, for example, in a preferred embodiment shown in FIG. 3 described below, a fourth external non-axial-direction fiber layer 34c is a non-aligned fiber layer, particularly a peripheral direction fiber-containing nonwoven fabric layer. Note that the above arrangement of fiber layers in the hollow body is based on the assumption that the curable resin is not included.

In particular, in the case where a peripheral direction fiber-containing nonwoven fabric layer, which is a non-aligned fiber layer, is disposed at a most peripheral surface of the hollow body, a nonwoven fabric layer of the peripheral direction fiber-containing nonwoven fabric layer is preferably disposed at a most peripheral surface of the hollow body. Specifically, concerning the peripheral direction fiber-containing nonwoven fabric layer, the internal non-axial-direction fiber layer 2 is more preferably used with a nonwoven fabric layer thereof being disposed at the innermost surface of the hollow body, and the external non-axial-direction fiber layer 3 is more preferably used with a nonwoven fabric layer thereof being disposed at the outermost surface of the hollow body. This is because reinforcing fibers of a peripheral-direction fiber layer adjacent thereto are allowed to be more easily aligned parallel to the peripheral direction, resulting in improvement in the design of the external appearance of the hollow body. For example, in FIG. 1, a peripheral direction fiber-containing nonwoven fabric layer as the second internal non-axial-direction fiber layer 22a is preferably used with the nonwoven fabric layer thereof being disposed at the innermost surface of the hollow body. A peripheral direction fiber-containing nonwoven fabric layer as the second external non-axial-direction fiber layer 32a is preferably used with the nonwoven fabric layer thereof being disposed at the outermost surface of the hollow body. Also, for example, in a preferred embodiment shown in FIG. 2 described below, a peripheral direction fiber-containing nonwoven fabric layer as the fourth internal non-axial-direction fiber layer 24b is preferably used with the nonwoven fabric layer thereof being disposed at the innermost surface of the hollow body. Also, for example, in a preferred embodiment shown in FIG. 3 described below, a peripheral direction fiber-containing nonwoven fabric layer as the fourth external non-axial-direction fiber layer 34c is preferably used with the nonwoven fabric layer thereof being disposed at the outermost surface of the hollow body.

In the case where a peripheral direction fiber-containing nonwoven fabric layer, which is a non-aligned fiber layer, is disposed at a portion other than a most peripheral surface of the hollow body, the peripheral direction fiber-containing nonwoven fabric layer may be used with the nonwoven fabric layer thereof either facing the axial-direction fiber layer 1, or facing in an opposite direction from the axial-direction fiber layer 1.

In addition, two or more non-aligned fiber layers may be successively disposed.

In the case where the non-axial-direction fiber layer 2 (3) includes two or more peripheral-direction fiber layers, two or more of the peripheral-direction fiber layers may be successively disposed, or a non-aligned fiber layer may be provided between the peripheral-direction fiber layers.

In the present technology disclosed herein, the mass ratio of all the reinforcing fibers of the axial-direction fiber layer to all the reinforcing fibers of the peripheral-direction fiber layer(s) is typically 100:1 to 100:100, and in terms of the strength of the hollow body, preferably 100:10 to 100:100, more preferably 100:20-100:80, and even more preferably 100:30 to 100:70. All the reinforcing fibers of the peripheral-direction fiber layer(s) means all the reinforcing fibers of all peripheral-direction fiber layer(s) included in the hollow body. In the case where a peripheral direction fiber-containing nonwoven fabric layer is used as a non-aligned fiber layer, reinforcing fibers serving as peripheral direction fibers contained in the peripheral direction fiber-containing nonwoven fabric layer are also included.

The mass ratio of all the reinforcing fibers of the axial-direction fiber layer to all the reinforcing fibers of the non-aligned fiber layer(s) is typically 100:10 to 100:100, and in terms of the strength of the hollow body, preferably 100:10 to 100:70, more preferably 100:20 to 100:50. All the reinforcing fibers of the non-aligned fiber layer(s) means all the reinforcing fibers contained in all non-aligned fiber layer(s) constituting the hollow body. In the case where a peripheral direction fiber-containing nonwoven fabric layer is used as a non-aligned fiber layer, reinforcing fibers constituting a nonwoven fabric layer contained in the peripheral direction fiber-containing nonwoven fabric layer are included, and reinforcing fibers serving as peripheral direction fibers of the peripheral direction fiber-containing nonwoven fabric layer are not included.

Although the hollow body 10a has a square shape in a cross-section perpendicular to the axial direction of the hollow body (may also be hereinafter simply referred to as a "vertical cross-section") shown in FIG. 1, the present disclosure is not limited to this as long as the hollow body 10a has a hollow shape. Specific examples of the vertically cross-sectional shape of the hollow body 10a include rectangular shapes, circular shapes, elliptical shapes, pentagonal or higher polygonal shapes, and composite shapes thereof. Rectangular shapes may include any suitable quadrilateral shapes, such as square shapes and rectangular shapes. In automotive applications, the hollow body preferably has a rectangular shape, particularly a square shape, in terms of ease of attachment to various members.

In the present technology disclosed herein, the fiber layers constituting the non-axial-direction fiber layer 2 (3) prefer-
ably overlap each other at end portions 4a and 4b in the peripheral direction thereof, as shown in FIG. 1. Specifically, as shown in FIG. 1, in the vertical cross-section, a first end portion of the non-axial-direction fiber layer 2 (3) is preferably disposed on top of a second end portion at a joint portion of these end portions, so that an overlap portion 4a, 4b is formed. The overlap portion is formed continuously in the axial direction of the hollow body. As a result, the hollow body can acquire a more sufficiently high strength.

Each fiber layer included in the non-axial-direction fiber layer 2 (3) may be a single fiber layer, like the second internal non-axial-direction fiber layer 22a of FIG. 1, i.e., does not include individual fiber layers separated from each other in the peripheral direction of the hollow body, and end portions of the fiber layer itself may overlap each other to form an overlap portion 4a. In FIG. 1, end portions of the second internal non-axial-direction fiber layer 22a itself overlap each other to form a single overlap portion 4a in the peripheral direction.

Each fiber layer included in the non-axial-direction fiber layer 2 (3) may include two or more individual fiber layers separated from each other in the peripheral direction of the hollow body, like the first internal non-axial-direction fiber layer 21a, the first external non-axial-direction fiber layer 31a, and the second external non-axial-direction fiber layer 32a of FIG. 1, and end portions in the peripheral direction of adjacent ones of these two or more fiber layers may overlap each other to form an overlap portion 4b. In FIG. 1, the first internal non-axial-direction fiber layer 21a, the first external non-axial-direction fiber layer 31a, and the second external non-axial-direction fiber layer 32a each include four individual fiber layers separated from each other in the peripheral direction of the hollow body, and end portions in the peripheral direction of adjacent ones of the four fiber layers overlap each other to form a total of four overlap portions 4b in the peripheral direction.

The position where the overlap portion is formed is not particularly limited. Preferably, end portions of a non-axial-direction fiber layer overlap each other at a position where stress is likely to be concentrated in the vertically cross-sectional shape of the hollow body, e.g., at or near an angle portion.

In the case where the vertical cross-section of the hollow body has, for example, a rectangular shape or polygonal shape, end portions of each fiber layer included in the non-axial-direction fiber layer 2 (3) preferably overlap each other at or near an angle portion of that shape in terms of improvement in design and further improvement in the strength of the hollow body. This is because stress is likely to be concentrated on an angle portion of these shapes, and therefore, the strength is further improved if an overlap portion is formed at or near an angle portion. Therefore, for a similar reason, when the hollow body has a rectangular shape or polygonal shape, the first internal non-axial-direction fiber layer 21a, the first external non-axial-direction fiber layer 31a, and the second external non-axial-direction fiber layer 32a each preferably include two or more individual fiber layers (particularly, 2-4 fiber layers) separated from each other in the peripheral direction of the hollow body with each end portion thereof in the peripheral direction of the hollow body being positioned at or near an angle portion. As a result, end portions in the peripheral direction of adjacent ones of the two or more (particularly, 2-4) fiber layers overlap each other at or near angle portions, so that overlap portions 4b are formed at or near the angle portions. Note that the term "at or near an angle portion" with respect to an overlap portion in the vertical cross-section means that the distance between the vertex of the angle portion and the overlap portion is within 5 mm. For example, the distance is preferably 0 mm, like the overlap portions 4b of FIG. 1.

In particular, a fiber layer disposed at the innermost surface of the hollow body, e.g., the second internal non-axial-direction fiber layer 22a of FIG. 1, is preferably a single fiber layer, i.e., does not include individual fiber layers separated from each other in the peripheral direction of the hollow body, and end portions of that fiber layer 22a itself preferably overlap each other, in terms of use of the cavity of the hollow body for transport.

The value (average value) of a breaking load (N) of the hollow body 10 as measured in a bending test described below varies depending on the proportions of materials for each layer of the hollow body 10, etc., and therefore, is not particularly limited. In terms of imparting a sufficiently high strength to the hollow body 10, the value of the breaking load is preferably 8000-30000 N, more preferably 9000-20000 N, and particularly preferably 10000-15000 N.

The value (average value) of a flexural modulus (GPa) of the hollow body 10 as measured in a bending test described below varies depending on the proportions of materials for each layer of the hollow body 10, etc., and therefore, is not particularly limited. In terms of imparting good workability to the hollow body 10, the value of the flexural modulus is preferably 18-50 GPa, more preferably 24.5-40 GPa, and particularly preferably 25-30 GPa.

Concerning the values of the breaking load and flexural modulus, it is desirable that the breaking load should fall within the above range. More preferably, both the values of the breaking load and flexural modulus desirably fall within the above respective ranges in terms of obtaining the hollow body 10 simultaneously having a high strength and good workability.

Figure 2:
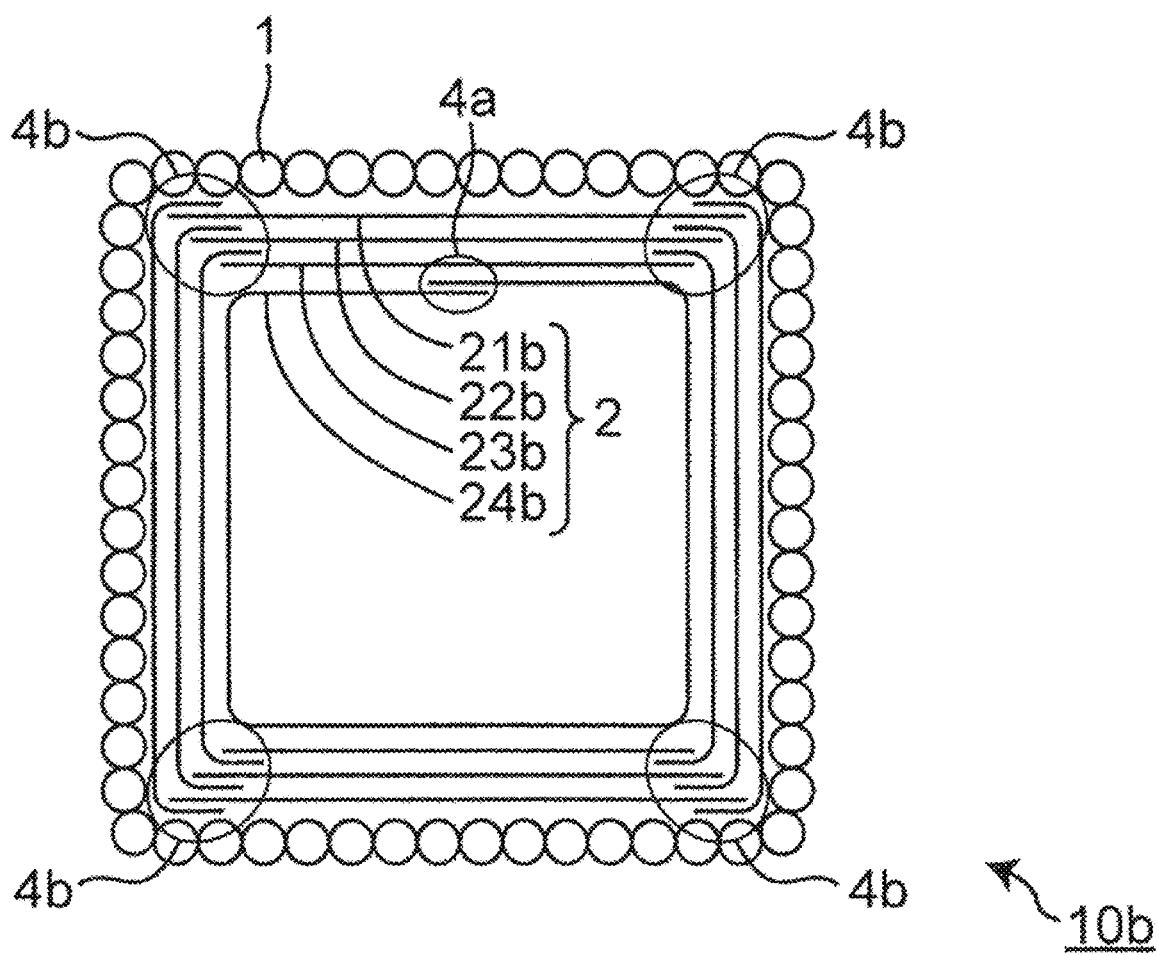
FIG. 2 is a schematic diagram showing a rough cross-section perpendicular to an axial direction in an example fiber-reinforced resin hollow body of the present technology disclosed herein.
Figure 3:
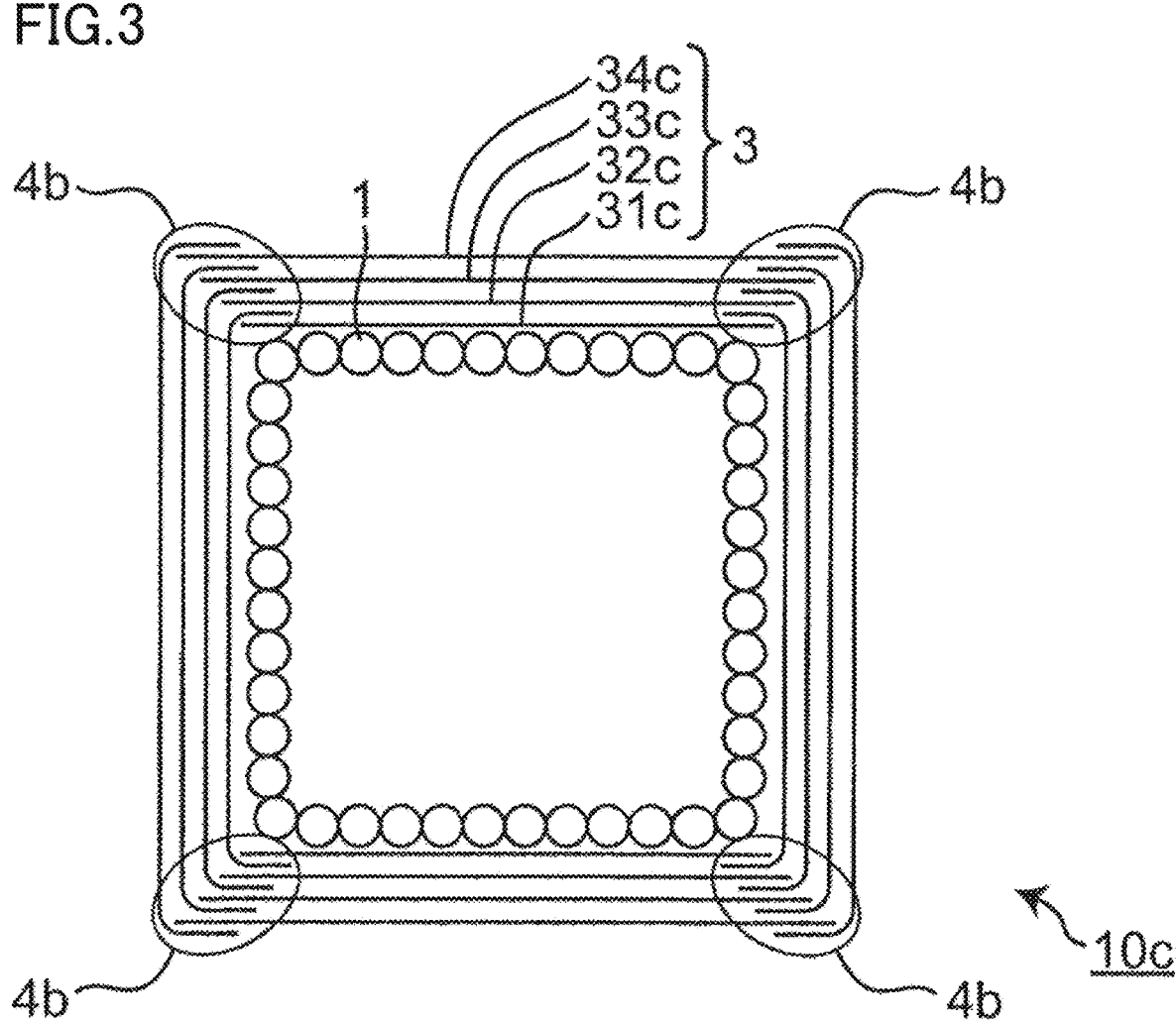
FIG. 3 is a schematic diagram showing a rough cross-section perpendicular to an axial direction in an example fiber-reinforced resin hollow body of the present technology disclosed herein.

Other embodiments of the present technology disclosed herein are shown in FIGS. 2 and 3. Note that, in the description of these embodiments, the same parts as those of the embodiment of FIG. 1 are indicated by the same reference characters and will not be described in detail. In terms of further improvement in the strength of the hollow body, the above embodiment of FIG. 1 and an embodiment of FIG. 2 described below are preferable, and the embodiment of FIG. 1 is more preferable.

Embodiment of FIG. 2

FIG. 2 shows a hollow body 10b that has a vertical cross-section having a rectangular shape, and has an axial-direction fiber layer 1, a first internal non-axial-direction fiber layer 21b, a second internal non-axial-direction fiber layer 22b, a third internal non-axial-direction fiber layer 23b, and a fourth internal non-axial-direction fiber layer 24b that are provided on top of the internal side of the axial-direction fiber layer 1. In FIG. 2, the axial-direction fiber layer 1 is similar to one that has been described above. The first internal non-axial-direction fiber layer 21b, the second internal non-axial-direction fiber layer 22b, the third internal non-axial-direction fiber layer 23b, and the fourth internal non-axial-direction fiber layer 24b are each independently selected from a range similar to that of the non-axial-direction fiber layer 2 (3) described above as long as the fiber layer includes one or more peripheral-direction fiber layers and one or more non-aligned fiber layers.

In this embodiment, the second internal non-axial-direction fiber layer 22b and the third internal non-axial-direction fiber layer 23b are each independently preferably a peripheral-direction fiber layer.

The first internal non-axial-direction fiber layer 21b is not particularly limited, and is, for example, a non-aligned fiber layer, particularly a peripheral direction fiber-containing nonwoven fabric layer.

The fourth internal non-axial-direction fiber layer 24b is preferably a non-aligned fiber layer, particularly a peripheral direction fiber-containing nonwoven fabric layer.

A peripheral direction fiber-containing nonwoven fabric layer as the first internal non-axial-direction fiber layer 21b may be used with the nonwoven fabric layer thereof being disposed in contact with the second internal non-axial-direction fiber layer 22b, or with the nonwoven fabric layer thereof being disposed in contact with the axial-direction fiber layer 1. A peripheral direction fiber-containing nonwoven fabric layer as the fourth internal non-axial-direction fiber layer 24b may be used with the nonwoven fabric layer thereof being disposed at the innermost surface of the hollow body, in terms of alignment of a peripheral-direction fiber layer as the third internal non-axial-direction fiber layer 23b. In this embodiment, in terms of further improvement in the strength of the hollow body, the first internal non-axial-direction fiber layer 21b, the second internal non-axial-direction fiber layer 22b, and the third internal non-axial-direction fiber layer 23b each preferably include four individual fiber layers separated from each other in the peripheral direction of the hollow body with having end portions thereof being positioned at or near angle portions, as shown in FIG. 2. As a result, in each of the first internal non-axial-direction fiber layer 21b, the second internal non-axial-direction fiber layer 22b, and the third internal non-axial-direction fiber layer 23b, end portions in the peripheral direction of adjacent ones of the four fiber layers overlap each other, and the resultant four overlap portions 4b are positioned at or near angle portions.

In this embodiment, the fourth internal non-axial-direction fiber layer 24b is preferably a single fiber layer, i.e., does not include individual fiber layers separated from each other in the peripheral direction of the hollow body, and end portions of the fiber layer 24b itself preferably overlap each other, in terms of use of the cavity of the hollow body for transport.

Embodiment of FIG. 3

FIG. 3 shows a hollow body 10c that has a vertical cross-section having a rectangular shape, and has an axial-direction fiber layer 1, a first external non-axial-direction fiber layer 31c, a second external non-axial-direction fiber layer 32c, a the third external non-axial-direction fiber layer 33c, and a fourth external non-axial-direction fiber layer 34c that are provided on top of the external side of the axial-direction fiber layer 1. In FIG. 3, the axial-direction fiber layer 1 is similar to one that has been described above. The first external non-axial-direction fiber layer 31c, the second external non-axial-direction fiber layer 32c, the third external non-axial-direction fiber layer 33c, and the fourth external non-axial-direction fiber layer 34c are each independently selected from a range similar to that of the non-axial-direction fiber layer 2 (3) described above as long as the fiber layer includes one or more peripheral-direction fiber layers and one or more non-aligned fiber layers.

In this embodiment, the second external non-axial-direction fiber layer 32c and the third external non-axial-direction fiber layer 33c are each independently preferably a peripheral-direction fiber layer.

The first external non-axial-direction fiber layer 31c is, for example, a non-aligned fiber layer, particularly a peripheral direction fiber-containing nonwoven fabric layer.

The fourth external non-axial-direction fiber layer 34c is preferably a non-aligned fiber layer, particularly a peripheral direction fiber-containing nonwoven fabric layer.

A peripheral direction fiber-containing nonwoven fabric layer as the first external non-axial-direction fiber layer 31c may be used with the nonwoven fabric layer thereof being disposed in contact with the second external non-axial-direction fiber layer 32c, or the nonwoven fabric layer thereof being disposed in contact with the axial-direction fiber layer 1. A peripheral direction fiber-containing nonwoven fabric layer as the fourth external non-axial-direction fiber layer 34c is preferably used with the nonwoven fabric layer thereof being disposed at the outermost surface of the hollow body, in terms of alignment of a peripheral-direction fiber layer as the third external non-axial-direction fiber layer 33c.

In this embodiment, in terms of further improvement in the strength of the hollow body, the first external non-axial-direction fiber layer 31c, the second external non-axial-direction fiber layer 32c, the third external non-axial-direction fiber layer 33c, and the fourth external non-axial-direction fiber layer 34c each preferably include four individual fiber layers separated from each other in the peripheral direction of the hollow body with end portions thereof being positioned at or near angle portions, as shown in FIG. 3. As a result, in each of the first external non-axial-direction fiber layer 31c, the second external non-axial-direction fiber layer 32c, the third external non-axial-direction fiber layer 33c, and the fourth external non-axial-direction fiber layer 34c, end portions in the peripheral direction of adjacent ones of the four fiber layers overlap each other, and the resultant four overlap portions 4b are positioned at or near angle portions.

(Other Materials)

The hollow body of the present technology disclosed herein includes the above fiber layers, and in addition, a curable resin permeating the fiber layers. As the curable resin, any one that has been conventionally used in fiber-reinforced resin hollow bodies can be used. Specific examples of the curable resin include thermosetting resins, such as unsaturated polyester resins, epoxy resins, vinyl ester resins, and phenolic resins.

The curable resin may contain an additive, such as a commonly used catalyst, release agent, pigment, shrinkage inhibitor, or silane coupling agent.

(Dimensions and External Appearance)

The hollow body of the present technology disclosed herein may have any suitable thickness, which may be determined, as appropriate, according to an application thereof. The hollow body of the present technology disclosed herein has a thickness of, for example, 1 to 20 mm, particularly 1 to 10 mm, and preferably 1 to 3 mm. The thickness of the hollow body refers to a wall thickness of the hollow body.

The hollow body of the present technology disclosed herein may have any suitable outer perimeter, which may be determined, as appropriate, according to an application thereof. The hollow body of the present technology disclosed herein has an outer perimeter of, for example, 125 to 300 mm. The outer perimeter of the hollow body refers to an outer perimeter of the hollow body in a vertical cross-section thereof. In the case where the vertically cross-sectional shape of the hollow body is a rectangular shape, the length of one side thereof is not particularly limited, and is, for example, 45 to 75 mm. In the case where the vertically cross-sectional shape of the hollow body is a circular shape, the diameter thereof is not particularly limited, and is, for example, 45 to 75 mm.

When an external appearance of the hollow body 10 of the present technology disclosed herein is visually observed, a pattern of the peripheral direction fibers is noticed on the external surface of the hollow body. This pattern may be deformed into, for example, a bow shape due to an influence of a frictional force that occurs when the peripheral-direction fiber layer is made contact with a die. In this regard, in terms of the high strength and excellent design of the hollow body 10, it is more desirable that the pattern of the peripheral direction fibers should not be deformed and should be observed running parallel to the peripheral direction. Therefore, as described above, a non-aligned fiber layer (mat layer) is preferably disposed at a most peripheral surface.

[Method for Manufacturing Fiber-Reinforced Resin Hollow Body]

Figure 4:
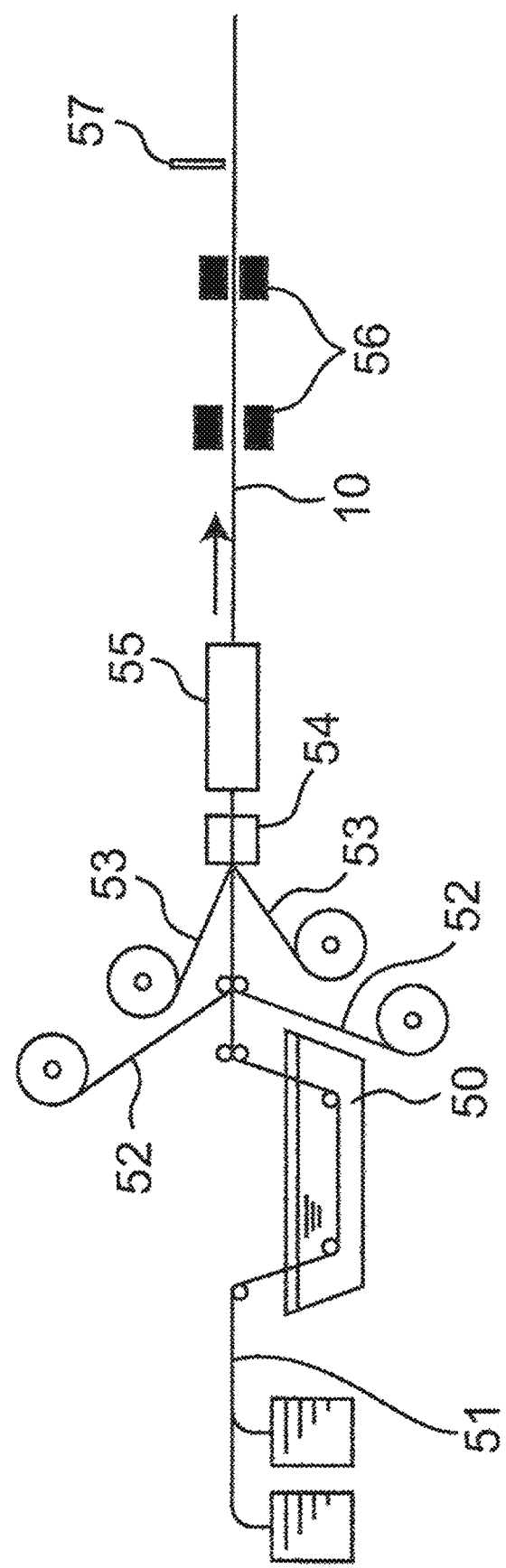
FIG. 4 is a schematic diagram showing a rough configuration of an example manufacturing apparatus for manufacturing, by pultrusion, the fiber-reinforced resin hollow body of the present technology disclosed herein.
Figure 5:
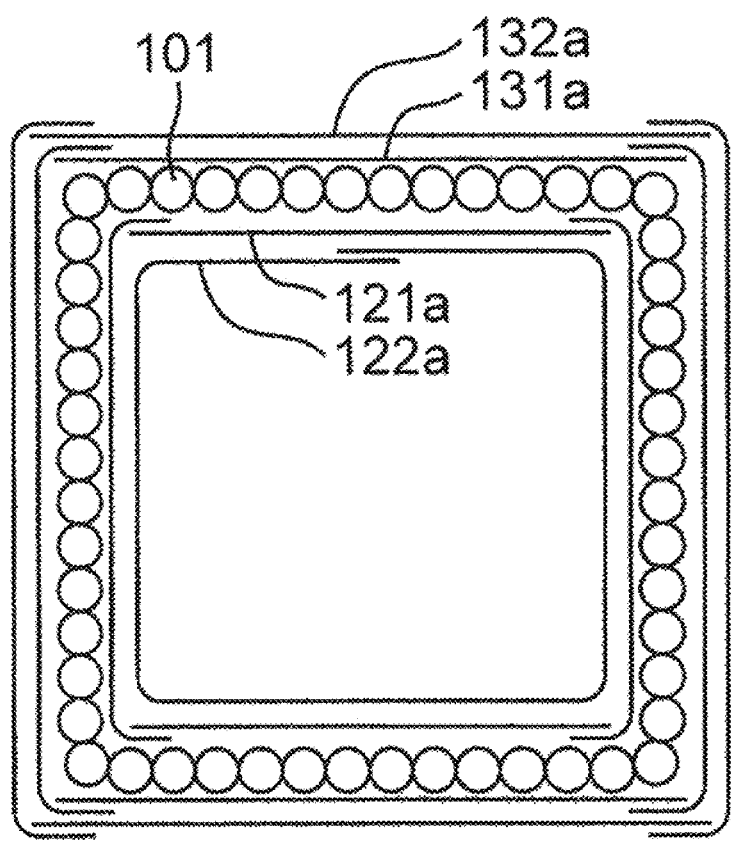
FIG. 5 is a schematic diagram showing a rough cross-section perpendicular to an axial direction of a conventional fiber-reinforced resin hollow body.

The fiber-reinforced resin hollow body of the present technology disclosed herein can be manufactured by pultrusion. In pultrusion, as specifically shown in FIG. 4, initially, reinforcing fibers 51 for constituting the axial-direction fiber layer 1 are impregnated with a curable resin 50. Next, the reinforcing fibers 51 impregnated with the curable resin joins a fiber sheet(s) (fiber layer) 52 for constituting the internal non-axial-direction fiber layer 2. Next, the reinforcing fibers 51 and the fiber sheets 52 join a fiber sheet(s) 53 for constituting the external non-axial-direction fiber layer 3. The number of the fiber sheets 52 is adjusted, as appropriate, according to the type and number of individual fiber layers constituting the internal non-axial-direction fiber layer 2. The number of the fiber sheets 53 is adjusted, as appropriate, according to the type and number of individual fiber layers constituting the external non-axial-direction fiber layer 3. Thereafter, these fibers and fiber sheets are guided by a guide 54 while being arranged such that a predetermined layered structure is obtained in the vertical cross-section. The fiber sheets 52 and the fiber sheets 53 are impregnated with the curable resin permeating the reinforcing fibers 51. The layered structure is pulled into a die 55 from one end thereof. At this time, the fiber sheets 52 and 53 are optionally adjusted by the guide 54 such that end portions in the peripheral direction thereof overlap each other. In the die 55, the curable resin is sufficiently cured by heating to obtain the fiber-reinforced resin hollow body 10. The resultant fiber-reinforced resin hollow body 10 is continuously pulled out of the die 55 using a pulling device 56 (e.g., the double gripper technology), and is subjected to a subsequent process, such as cutting into a predetermined length using a cutter 57.

EXAMPLES

Next, examples that were specifically carried out will be described.

(Bending Test)

A three-point bending test was carried out on specimens of fiber-reinforced resin hollow bodies according to examples using a procedure described below, to calculate the breaking load and flexural modulus of each specimen.

Figure 6B:
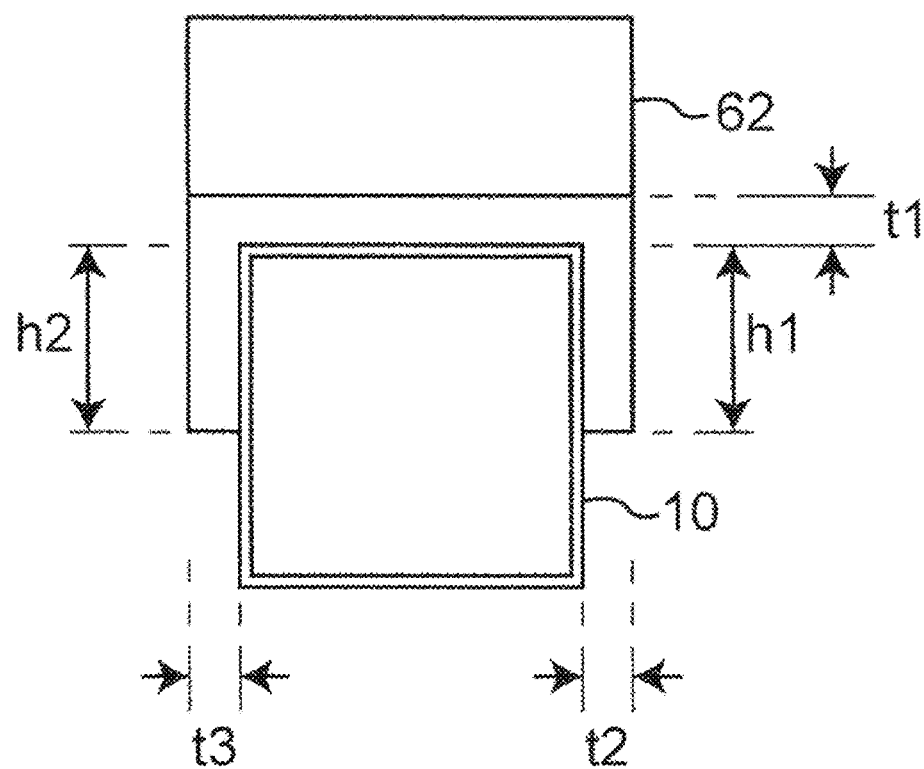
FIG. 6B is a diagram for describing a procedure for a bending test that was carried out using specimens of examples.
Figure 6C:
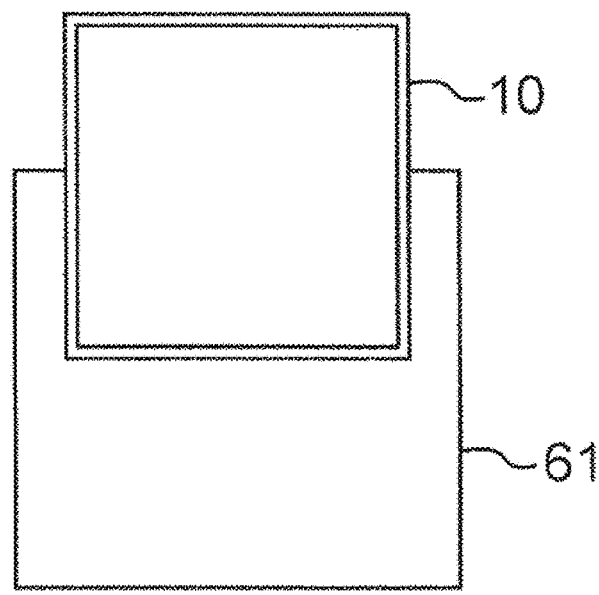
FIG. 6C is a diagram for describing a procedure for a bending test that was carried out using specimens of examples.

Specifically, as shown in FIG. 6A, each specimen (fiber-reinforced resin hollow body) 10 having a length of 1400 mm described below was placed on a U-shaped flexure 61 having a support span k of 800 mm. Thereafter, a load was applied to a center portion of the specimen 10 until it broke, using a testing jig 62 with a cover member (U-shaped jig) 11 being interposed between the specimen 10 and the testing jig 62, at a crosshead speed of 20 mm/min. The vertical deflection of the center portion to which the load was applied, i.e., the vertical deflection of the crosshead, and the value of the load, were measured. The breaking load and flexural modulus of the specimen was calculated from the vertical deflection and the load value. Note that FIGS. 6B and 6C are cross-sectional views taken along B-B and C-C, respectively, of FIG. 6A.

The cover member 11 was made of steel, and had a thickness (t1=t2=t3) (see FIG. 6B) of 10 mm, a cover depth (h1=h2) (see FIG. 6B) of 38.8 mm, and an axial direction length (j) (see FIG. 6A) of 100 mm. The specimen 10 was not joined to the cover member 11 using a bolt or the like.

Note that the bending test was carried out on lots of four specimens having the same configuration. After the breaking loads of each lot were calculated, the average of the four calculated values of each lot was calculated, and the average value was regarded as the breaking load of each specimen. This is true of the flexural modulus of each specimen.

(Specimens)

Figure 7:
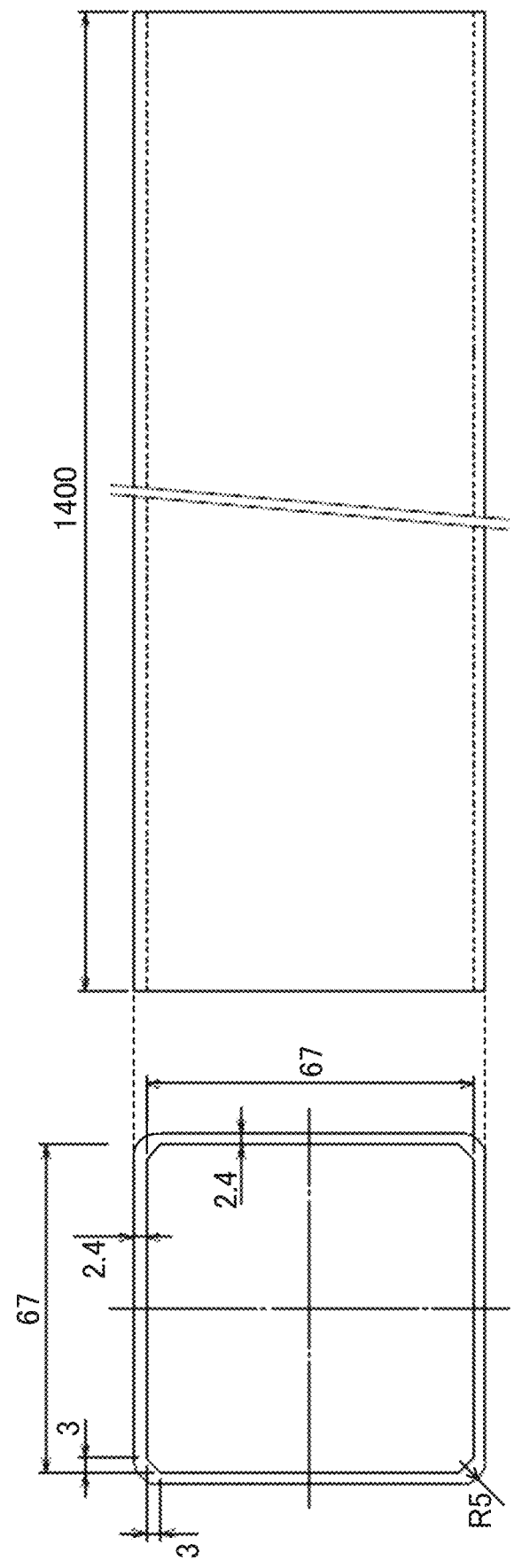
FIG. 7 is a diagram showing shapes and dimensions of specimens of examples.

Hollow body specimens of the examples were prepared using the above method for manufacturing the fiber-reinforced resin hollow body. FIG. 7 shows the shapes and dimensions of the specimens used in the examples described below. Note that the unit of the numerical values in FIG. 7 is "mm."

Also, FIG. 8 shows materials used in the examples.

Tables 1 and 2, and FIGS. 9A, 9B, 10, and 11 show the configurations of specimens A-1, A-2, C-1, and C-2 of Examples 1-4, and their breaking loads and flexural moduli resulting from the bending test.

TABLE 1

Figure 9A:
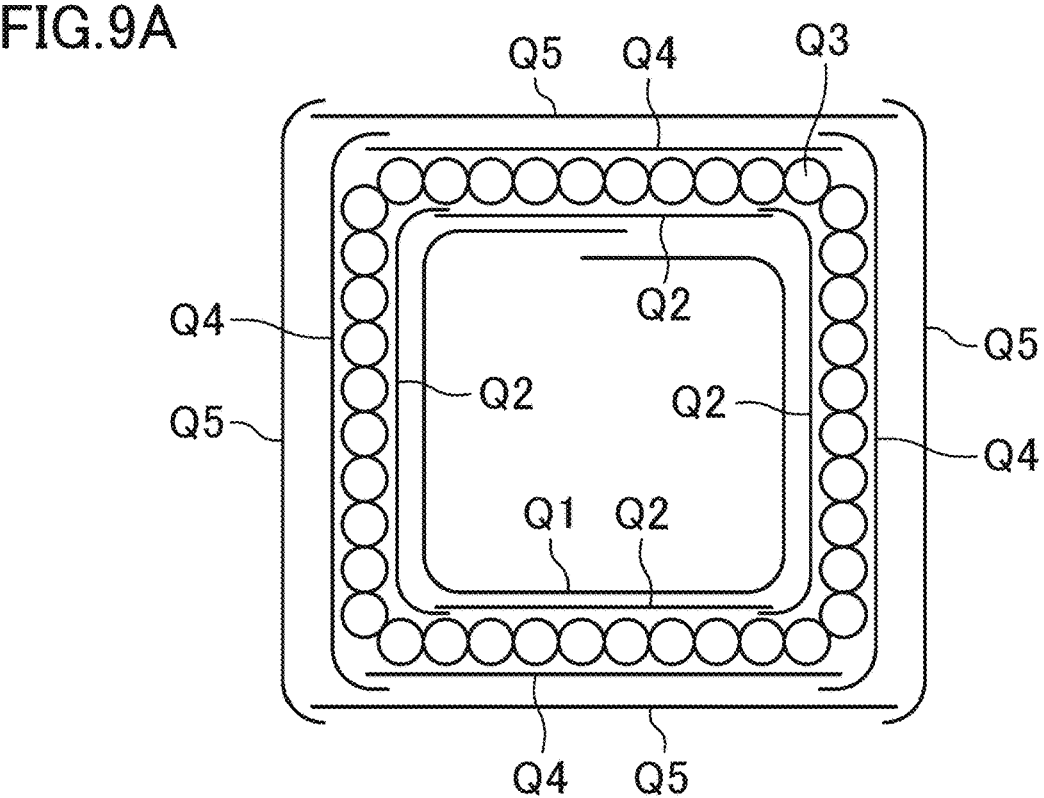
FIG. 9A is a diagram for describing configurations of specimens of Examples 1 and 2.
Figure 9B:
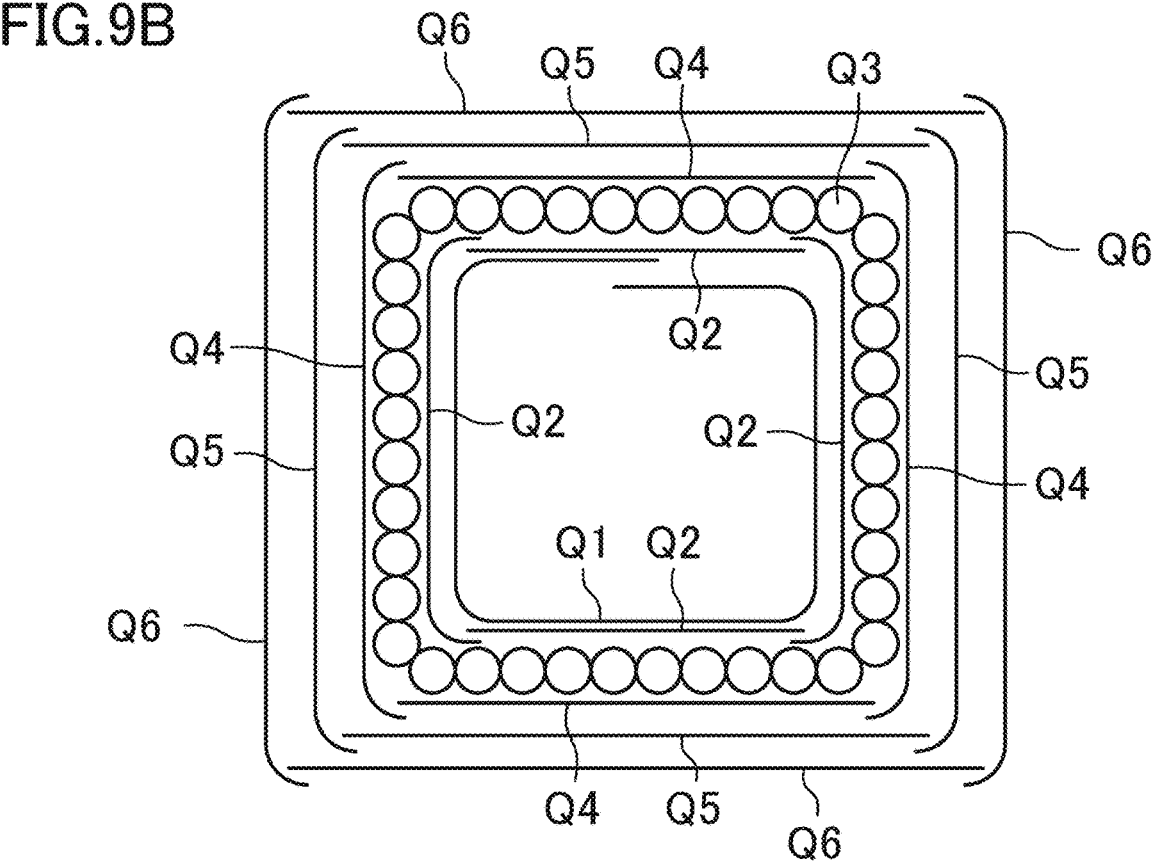
FIG. 9B is a diagram for describing configurations of specimens of Examples 3 and 4.

| | | | Example 1 (A-1) | Example 2 (A-2) | Example 3 (C-1) | Example 4 (C-2) |
|---|---|---|---|---|---|---|
| Layered structure | Internal non-axial direction fabric layer | First layer Q1 | Single stitched cord-fabric mat layer (mat layer disposed at innermost surface) | | | |
| | | Second layer Q2 | Single S2 cord fabric layer | | | |
| | Axial direction fabric layer Q3 | | Rovings | | | |
| | External non-axial direction fabric layer | First layer Q4 | Single S2 cord fabric layer | | | |
| | | Second layer Q5 | Single stitched cord-fabric mat layer (mat layer disposed at outermost surface) | Single stitched cord-fabric mat layer (cord-fabric layer disposed at outermost surface) | Single S1 cord-fabric layer | Single chopped strand mat layer |
| | | Third layer Q6 | — | — | Single chopped strand mat layer | Single S1 cord-fabric layer |
| | Cross-sectional view of molded article | | FIG. 9A | | FIG. 9B | |

TABLE 2

| | Material proportions | | | | | | | | | Flexural |
| | Amounts of glass fibers (g/m) | | | | Mass of resin (g/m) | Length of product (mm) | Mass of product (kg) | Mass per unit (kg/m) | Breaking load (N) Average | modulus (GPa) Average |
| Specimens | Peripheral direction | Axial direction | Random directions | Total | | | | | | |
|---|---|---|---|---|---|---|---|---|---|---|
| Example 1 (A-1) | 239.2 | 549.2 | 180.0 | 968.4 | 301.6 | 1402 | 1.78 | 1.27 | 11027 | 26.20 |
| Example 2 (A-2) | 239.2 | 549.2 | 180.0 | 968.4 | 301.6 | | | | 11081 | 25.03 |
| Example 3 (C-1) | 239.2 | 549.2 | 180.0 | 968.4 | 301.6 | 1402 | 1.78 | 1.27 | 10909 | 25.60 |
| Example 4 (C-2) | 239.2 | 549.2 | 180.0 | 968.4 | 301.6 | | | | 10731 | 25.82 |

Figure 10:
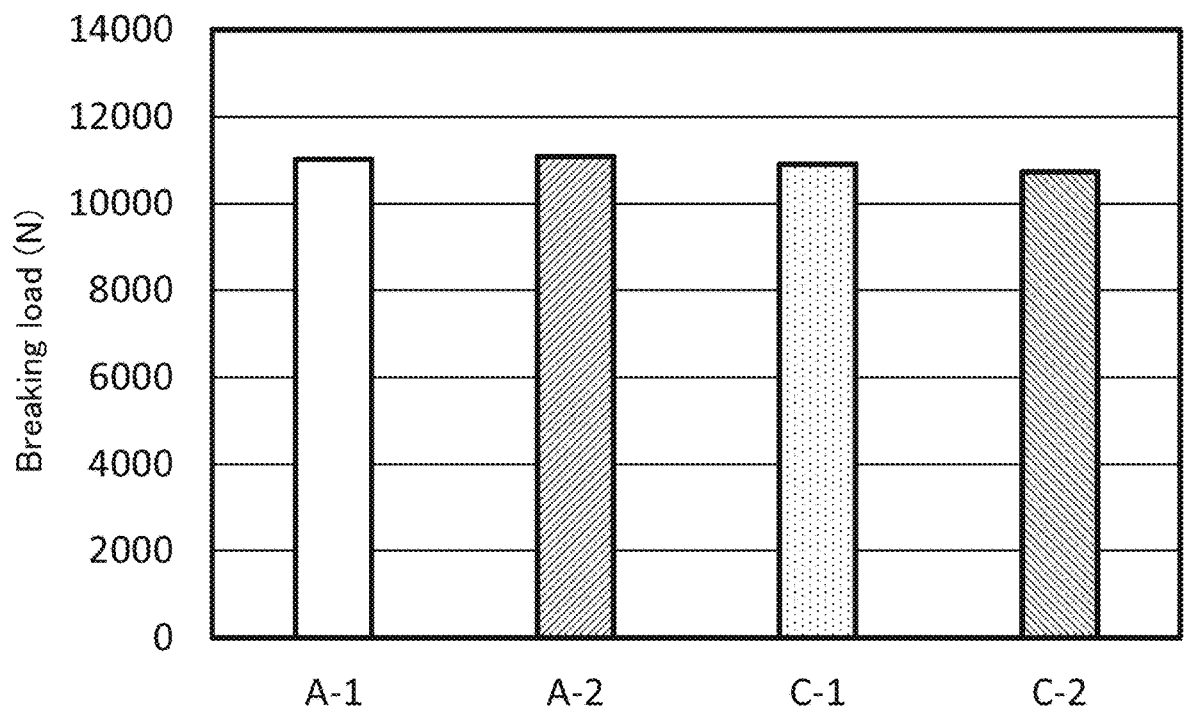
FIG. 10 is a graph showing breaking loads of the specimens of Examples 1-4.
Figure 11:
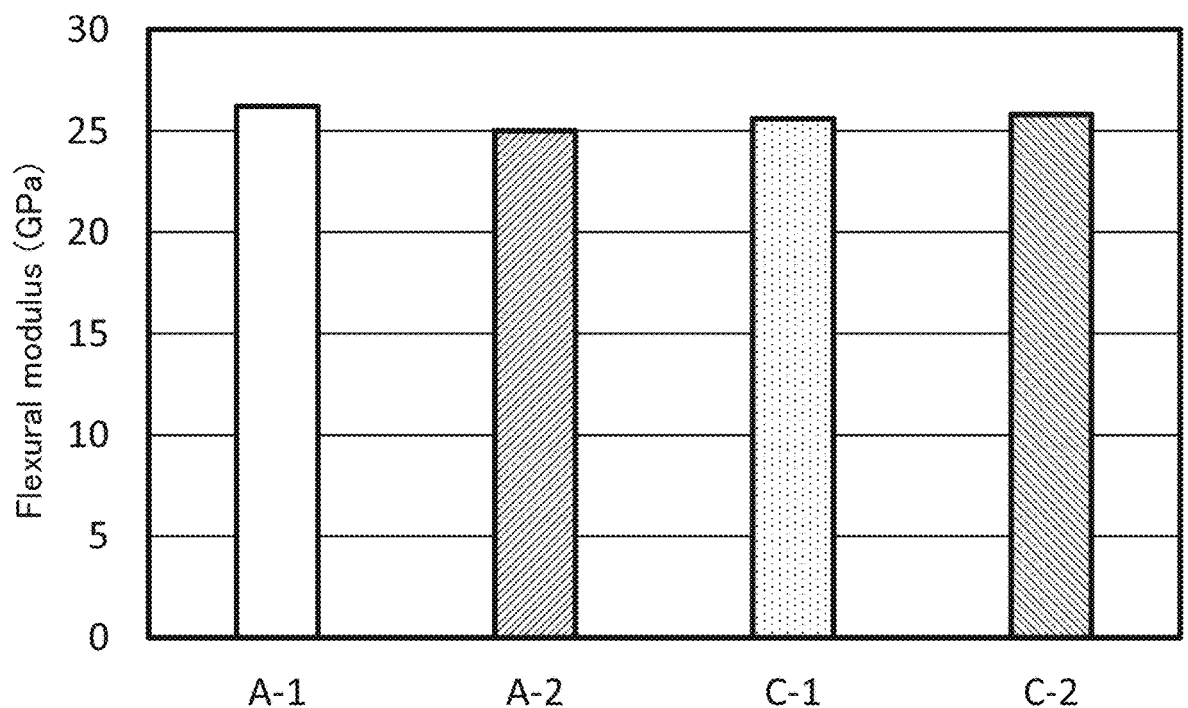
FIG. 11 is a graph showing flexural moduli of the specimens of Examples 1-4.

As shown in Table 2 and FIGS. 10 and 11, the specimens A-1 and A-2 of Examples 1 and 2 each include an external non-axial-direction fiber layer containing a stitched cord-fabric mat shown in FIG. 8. In the specimen A-1, the mat layer (non-aligned fiber layer) of the stitched cord-fabric mat is disposed at the outermost surface. In the specimen A-2, the cord-fabric layer (peripheral-direction fiber layer) of the stitched cord-fabric mat is disposed at the outermost surface. In both of the specimens, a good breaking load and flexural modulus were obtained. Thus, it was found that even if the order of the layers at the outermost surface is reversed, a fiber-reinforced resin hollow body having a sufficiently high strength and excellent workability is obtained.

The specimens C-1 and C-2 of Examples 3 and 4 each include a non-stitched outermost layer. In the specimen C-1, the chopped strand mat of the outermost layer is disposed at the outermost surface (corresponding to the specimen A-1 having a mat layer disposed at the outermost surface). In the specimen C-2, the S1 cord fabric of the outermost layer is disposed at the outermost surface (corresponding to the specimen A-2 having a cord-fabric layer disposed at the outermost surface). In both of the specimens, a good breaking load and flexural modulus were obtained. Thus, it was found that, in both of the cases, a fiber-reinforced resin hollow body having a sufficiently high strength and excellent workability is obtained. By comparison between the results of Examples 1 and 2 and Examples 3 and 4, it was found that a hollow body having a stitched layer (Examples 1 and 2) has a slightly higher strength than that of a hollow body not having a stitched layer (Examples 3 and 4).

Figure 12:
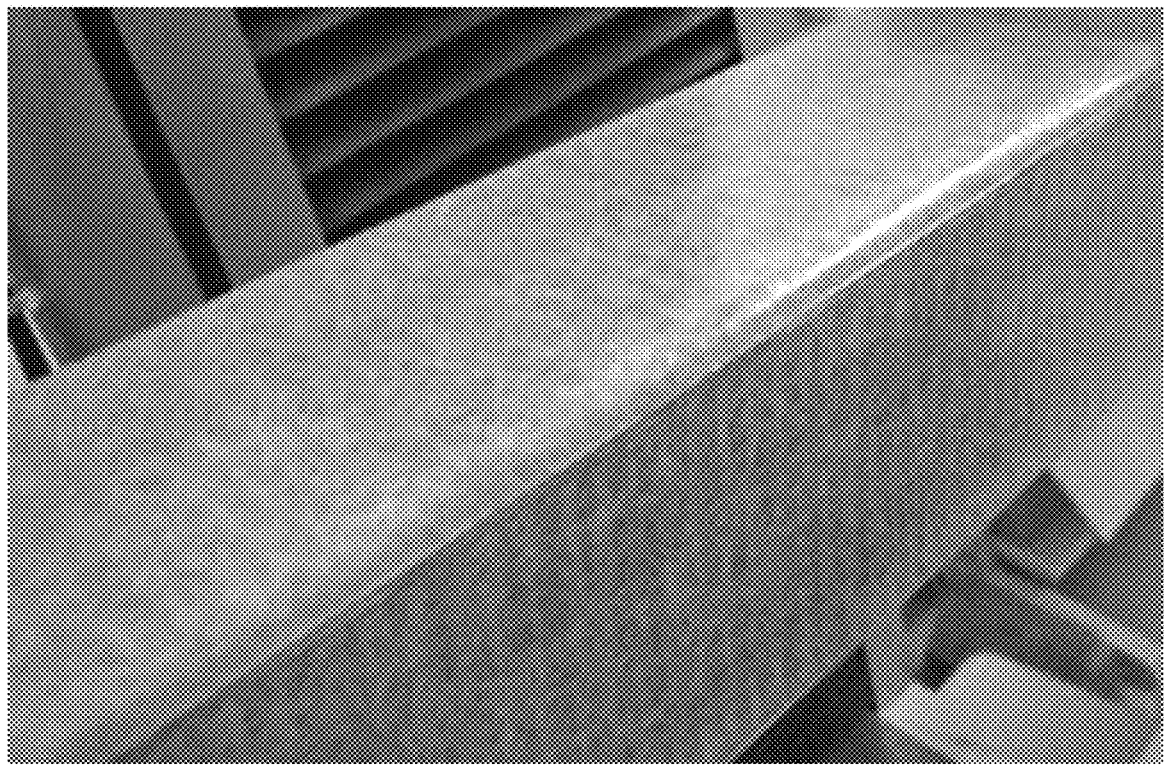
FIG. 12 is a photograph showing an external appearance of the specimen of Example 3.
Figure 13:
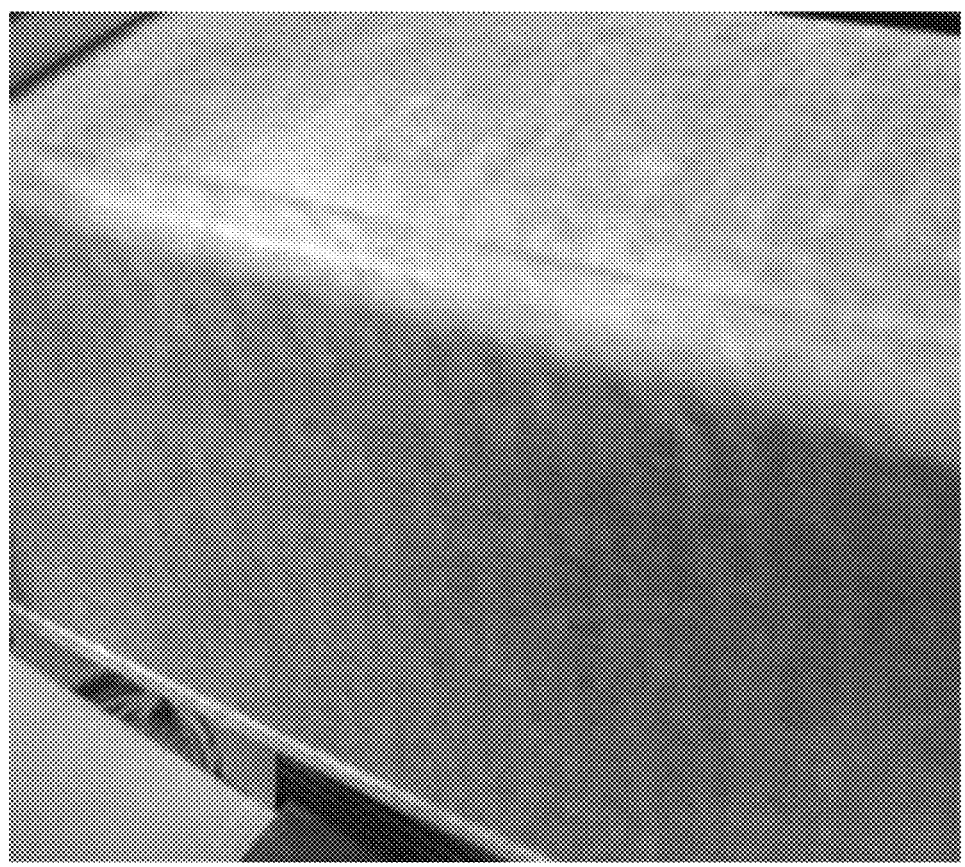
FIG. 13 is a photograph showing an external appearance of the specimen of Example 4.

In addition, external appearance was visually observed. FIGS. 12 and 13 show photographs of external appearances of the specimens C-1 (Example 3) and C-2 (Example 4). It was found that, compared to the external appearance of the specimen C-1 shown in FIG. 12, the external appearance of the specimen C-2 shown in FIG. 13 has a pattern of a peripheral-direction fiber layer appearing at the surface that is deformed into a bow shape. This is considered to be caused by a frictional force that occurs when the peripheral-direction fiber layer is made contact with a die. It is considered that when an importance is put on the design of the external appearance of a product, a non-aligned layer (mat layer) is preferably disposed at the most peripheral surface, as in the specimen C-1.

Next, specimens having configurations shown in Tables 3 and 4 were prepared for the fiber-reinforced resin hollow bodies 10 of FIGS. 1-3. The bending test was carried out to obtain breaking loads and flexural moduli shown in Table 4.

TABLE 3

| | Specimen | Example 5 | Example 6 | Example 7 |
|---|---|---|---|---|
| Layered structure | Internal non-axial direction fabric layer | — | 24b: composite layer A (mat layer disposed at innermost surface) 23b: cord-fabric layer A | — |
| | | 22a: composite layer A (mat layer disposed at innermost surface) | 22b: cord-fabric layer A | |
| | | 21a: cord-fabric layer A | 21b: composite layer A (mat layer facing roving layer A) | |
| | Axial direction fabric layer | | 1: roving layer A | |
| | External non-axial direction fabric layer | 31a: cord-fabric layer A | — | 31c: composite layer A (mat layer facing roving layer A) |
| | | 32a: composite layer A (mat layer disposed at outermost surface) | | 32c: cord-fabric layer A |
| | | — | | 33c: cord-fabric layer A |
| | | | | 34c: composite layer A (mat layer disposed at outermost surface) |
| | Cross-sectional view of molded article | FIG. 1 | FIG. 2 | FIG. 3 |

TABLE 4

| | Material proportions | | | | | | | | Flexural |
|---|---|---|---|---|---|---|---|---|---|
| | Amounts of glass fibers (g/m) | | | | Mass of resin (g/m) | Length of product (mm) | Mass of product (kg) | Mass per unit (kg/m) | Breaking load (N) Average | modulus (GPa) Average |
| Specimens | Peripheral direction | Axial direction | Random directions | Total | | | | | | |
| Example 5 | 239.2 | 488.0 | 180.0 | 907.0 | 312.8 | 1403 | 1.72 | 1.23 | 12170 | 22.69 |
| Example 6 | | | | | | | | | 10360 | 19.67 |
| Example 7 | | | | | | | 1.71 | 1.22 | 8390 | 22.58 |

In Table 3, a composite layer A included only a single "stitched cord-fabric mat" layer shown in FIG. 8, and the mat layer was disposed as indicated in Table 3. A cord-fabric layer A included only a single "S2 cord-fabric" layer shown in FIG. 8. A roving layer A included a "roving" shown in FIG. 8. Note that, as shown in Table 4, specimens of Examples 5-7 contained materials at proportions different from those of Examples 1-4 shown in Table 2.

In the specimen of Example 5, a non-axial-direction fiber layer was provided on both the internal and external sides of an axial-direction fiber layer. In the specimens of Examples 6 and 7, a non-axial-direction fiber layer was provided on only one of the internal and external sides of an axial-direction fiber layer. It was found that the specimen of Example 5 had both a good breaking load and flexural modulus compared to the specimens of Examples 6 and 7.

As described above, the present technology disclosed herein can provide a fiber-reinforced resin hollow body having a sufficiently high strength.

INDUSTRIAL APPLICABILITY

The fiber-reinforced resin hollow body of the present technology disclosed herein is useful as various members for use in a variety of fields, such as the fluid transport field, architecture field, and automotive field. The fiber-reinforced resin hollow body of the present technology disclosed herein is particularly useful as a member for directly or indirectly supporting and fixing an automotive instrument panel. Examples of such a member include, in the automotive field, cross-car beams, center members, brake pedal rearward displacement preventing brackets, cowl brackets, steering bracket uppers, and steering bracket lowers.

DESCRIPTION OF REFERENCE CHARACTERS

1 AXIAL-DIRECTION FIBER LAYER
2 NON-AXIAL-DIRECTION FIBER LAYER
3 NON-AXIAL-DIRECTION FIBER LAYER
4a, 4b OVERLAP PORTION
10, 10a, 10b, 10c FIBER-REINFORCED RESIN HOLLOW BODY
21a, 21b FIRST INTERNAL NON-AXIAL-DIRECTION FIBER LAYER
22a, 22b SECOND INTERNAL NON-AXIAL-DIRECTION FIBER LAYER
23b THIRD INTERNAL NON-AXIAL-DIRECTION FIBER LAYER
24b FOURTH INTERNAL NON-AXIAL-DIRECTION FIBER LAYER
31a, 31c FIRST EXTERNAL NON-AXIAL-DIRECTION FIBER LAYER
32a, 32c SECOND EXTERNAL NON-AXIAL-DIRECTION FIBER LAYER
33c THIRD EXTERNAL NON-AXIAL-DIRECTION FIBER LAYER
34c FOURTH EXTERNAL NON-AXIAL-DIRECTION FIBER LAYER

The invention claimed is:

1. A fiber-reinforced resin hollow body comprising:
an axial-direction fiber layer containing reinforcing fibers aligned parallel to an axial direction of the hollow body; and
a non-axial-direction fiber layer provided over at least one of an internal and an external side of the axial-direction fiber layer, and containing reinforcing fibers oriented in a direction different from a direction in which the reinforcing fibers contained in the axial-direction fiber layer are aligned,
wherein
the non-axial-direction fiber layer includes one or more peripheral-direction fiber layers containing reinforcing fibers aligned parallel to a periphery of the hollow body, perpendicular to the axial direction of the hollow body, and one or more non-aligned fiber layers containing reinforcing fibers not aligned in a specific direction, and
the one or more non-aligned fiber layers are disposed at least at an outermost surface and an innermost surface of the hollow body.

2. The fiber-reinforced resin hollow body of claim 1, wherein
each of the non-aligned fiber layers disposed at the outermost surface and innermost surface is disposed next to the one or more peripheral-direction fiber layers.

3. The fiber-reinforced resin hollow body of claim 1, wherein
the non-axial-direction fiber layer is provided on top of both the internal and external sides of the axial-direction fiber layer.

4. The fiber-reinforced resin hollow body of claim 1, wherein
the fiber-reinforced resin hollow body has a rectangular shape in a cross-section with respect to the axial direction.

5. The fiber-reinforced resin hollow body of claim 1, wherein
the mass ratio of all the reinforcing fibers of the axial-direction fiber layer to all the reinforcing fibers of the non-axial-direction fiber layer is 100:20 to 100:200.

6. The fiber-reinforced resin hollow body of claim 1, wherein
the mass ratio of all the reinforcing fibers of the axial-direction fiber layer to all the reinforcing fibers of the one or more peripheral-direction fiber layers is 100:1 to 100:100, and
a mass ratio of all the reinforcing fibers of the axial-direction fiber layer to all the reinforcing fiber of the one or more non-aligned fiber layers is 100:10 to 100:100.

7. The fiber-reinforced resin hollow body of claim 1, wherein
the fiber-reinforced resin hollow body is impregnated with a curable resin.

8. The fiber-reinforced resin hollow body of claim 1, wherein
the fiber-reinforced resin hollow body has a thickness of 1 to 20 mm.

9. The fiber-reinforced resin hollow body of claim 1, wherein
the fiber-reinforced resin hollow body has an outer perimeter of 125 to 300 mm.

10. The fiber-reinforced resin hollow body of claim 1, wherein
the fiber-reinforced resin hollow body is a member for directly or indirectly supporting and fixing an automotive instrument panel.

11. The fiber-reinforced resin hollow body of claim 10, wherein
the member is a cross-car beam.

12. A method for manufacturing by pultrusion a fiber-reinforced resin hollow body including an axial-direction fiber layer containing reinforcing fibers aligned parallel to an axial direction of the hollow body and a non-axial-direction fiber layer provided over at least one of an internal and an external side of the axial-direction fiber layer, and containing reinforcing fibers oriented in a direction different from a direction in which the reinforcing fibers contained in the axial-direction fiber layer are aligned, wherein
- the non-axial-direction fiber layer includes one or more peripheral-direction fiber layers containing reinforcing fibers aligned parallel to a periphery of the hollow body, perpendicular to the axial direction of the hollow body, and one or more non-aligned fiber layers containing reinforcing fibers not aligned in a specific direction, and
- the one or more non-aligned fiber layers are disposed at least at an outermost surface and an innermost surface of the hollow body.

\* \* \* \* \*